(12) United States Patent
Kim et al.

(10) Patent No.: US 12,313,049 B2
(45) Date of Patent: May 27, 2025

(54) MOTOR AND POSITION SENSING ARRANGEMENT

(71) Applicant: LG INNOTEK CO., LTD., Seoul (KR)

(72) Inventors: Yong Jin Kim, Seoul (KR); Ki Woong Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 334 days.

(21) Appl. No.: 17/788,041

(22) PCT Filed: Jan. 5, 2021

(86) PCT No.: PCT/KR2021/000089
§ 371 (c)(1),
(2) Date: Jun. 22, 2022

(87) PCT Pub. No.: WO2021/141362
PCT Pub. Date: Jul. 15, 2021

(65) Prior Publication Data
US 2023/0028181 A1     Jan. 26, 2023

(30) Foreign Application Priority Data

Jan. 9, 2020   (KR) .................. 10-2020-0003271
Jan. 17, 2020  (KR) .................. 10-2020-0006798

(51) Int. Cl.
*F04B 17/03*     (2006.01)
*H02K 5/10*      (2006.01)
(Continued)

(52) U.S. Cl.
CPC ............. *F04B 17/03* (2013.01); *H02K 5/10* (2013.01); *H02K 7/003* (2013.01); *H02K 11/215* (2016.01)

(58) Field of Classification Search
CPC .......... F04B 17/03; H02K 5/10; H02K 7/003; H02K 11/215; H02K 5/1732; H02K 5/225; H02K 11/33
(Continued)

(56) References Cited

U.S. PATENT DOCUMENTS 10,243,432 B2 *   3/2019  Hieda .............. H02K 11/0141
2014/0145564 A1 * 5/2014  Taniguchi ........... H02K 5/1732
                                                  310/68 B
(Continued)

FOREIGN PATENT DOCUMENTS

DE   10-2015-205872    4/2015
JP   2012-114997       6/2012
(Continued)

OTHER PUBLICATIONS

JP 2017015658; Nakai Motoo et al. (Year: 2017).*
(Continued)

*Primary Examiner* — Ahmed Elnakib
(74) *Attorney, Agent, or Firm* — KED & ASSOCIATES, LLP

(57) ABSTRACT

A motor comprises: a housing including a partition wall for partitioning a first space and a second space; a stator arranged in the first space; a rotor arranged in the stator, a shaft rotating along with the rotor and having a sensor magnet arranged at an end thereof; and a printed circuit board arranged in the second space and having a position detection sensor arranged on a surface thereof, the position detection sensor facing the sensor magnet in the vertical direction, wherein the partition wall has a shaft hole penetrating therethrough from a surface to the other surface.

17 Claims, 12 Drawing Sheets

(51) Int. Cl.
   *H02K 7/00* (2006.01)
   *H02K 11/215* (2016.01)
(58) Field of Classification Search
   USPC ...................................................... 310/68 B
   See application file for complete search history.

(56) References Cited

U.S. PATENT DOCUMENTS

| | | | |
|---|---|---|---|
| 2017/0040874 A1* | 2/2017 | Han ..................... | G01D 11/245 |
| 2017/0133906 A1 | 5/2017 | Pfeiffer et al. | |
| 2018/0278115 A1 | 9/2018 | Wu et al. | |
| 2019/0356203 A1* | 11/2019 | Takahashi .............. | H02K 21/14 |
| 2020/0212753 A1* | 7/2020 | Okuhata ................ | H02K 11/33 |
| 2021/0211020 A1* | 7/2021 | Choi ...................... | H02K 11/25 |
| 2022/0006363 A1* | 1/2022 | Choi ..................... | H02K 11/215 |
| 2023/0283150 A1* | 9/2023 | Woo ..................... | H02K 11/215 310/48 |

FOREIGN PATENT DOCUMENTS

| | | |
|---|---|---|
| JP | 2016-100972 | 5/2016 |
| JP | 2016-192851 | 11/2016 |
| JP | 2017-015658 | 1/2017 |
| JP | 2017-520227 | 7/2017 |
| JP | 2017-163809 | 9/2017 |
| JP | 2019-077436 | 5/2019 |
| KR | 10-2013-0067045 | 6/2013 |
| KR | 10-2017-0120699 | 10/2017 |
| KR | 10-2002727 | 7/2019 |
| KR | 10-2057327 | 12/2019 |

OTHER PUBLICATIONS

DE 102004059918; Kaul et al. (Year: 2004).*
KR20040051811; Jin et al. (Year: 2002).*
JP-2018126043 (Year: 2018).*
International Search Report dated Apr. 15, 2021 issued in Application No. PCT/KR2021/000089.
European Search Report dated May 30, 2023 issued in Application No. 21738894.1.
Japanese Office Action dated Aug. 20, 2024 issued in Application No. 2022-540430.
Korean Office Action dated Jan. 15, 2025 issued in Application No. 10-2020-0003271.
Korean Office Action dated Jan. 20, 2025 issued in Application No. 10-2020-0006798.

* cited by examiner

MOTOR AND POSITION SENSING ARRANGEMENT

CROSS-REFERENCE TO RELATED PATENT APPLICATIONS

This application is a U.S. National Stage Application under 35 U.S.C. § 371 of PCT Application No. PCT/KR2021/000089, filed Jan. 5, 2021, which claims priority to Korean Patent Application Nos. 10-2020-0003271, filed Jan. 9, 2020 and 10-2020-0006798, filed Jan. 17, 2020, whose entire disclosures are hereby incorporated by reference.

TECHNICAL FIELD

The present embodiment relates to a motor.

BACKGROUND ART

The content described below provides background information on the present embodiment and does not describe the prior art.

The pump serves to discharge the flow rate at a constant pressure. The oil circulated by the pump can be used to operate hydraulic systems using hydraulic pressure, or for cooling or lubricating effects.

A mechanical oil pump (MOP) is an oil pump that operates using the power of a machine such as an engine.

Recently, research on hybrid vehicles and electric vehicles has been actively conducted for the purpose of improving fuel efficiency and reducing the amount of carbon emissions.

Accordingly, the demand for an electric oil pump (EOP) operated by a motor instead of a mechanical oil pump (MOP) operated by the power of a machine such as an engine is increasing.

The EOP may include a normal motor area and a pump area. The motor area includes a stator, a rotor and a rotating shaft. The pump area includes an inner rotor coupled to one end of the rotating shaft to receive rotational force from the rotating shaft, and an outer rotor accommodating the inner rotor.

In order to detect the position of the rotor or rotating shaft, a magnet may be mounted on an end portion of the rotating shaft. In addition, a printed circuit board on which a position detection sensor is mounted may be disposed in a region partitioned from the motor region. Accordingly, the position detection sensor detects the magnetic force generated from the magnet according to the rotation of the rotating shaft, and the position of the rotating shaft may be detected.

When considering the structural characteristics inside the pump, the printed circuit board should be disposed in an area partitioned from the arrangement area of the rotating shaft. However, as the distance between the magnet and the position detection sensor increases, the change in the strength of the magnetic force becomes weaker, so there is a problem in that the rotated positions of the rotor and the rotating shaft cannot be accurately detected.

DETAILED DESCRIPTION OF THE INVENTION

Technical Subject

The present embodiment is intended to provide a motor capable of accurately detecting the position of the rotating shaft by improving the structure and reducing the size of the product.

Technical Solution

In one embodiment, the motor comprises: a housing including a partition wall partitioning a first space and a second space; a stator disposed inside the first space; a rotor disposed inside the stator; a shaft rotating together with the rotor and having a sensor magnet disposed at one end thereof; and a printed circuit board disposed in the second space and having a position detection sensor disposed on one surface to face the sensor magnet in an up-down direction, wherein a shaft hole is disposed in the partition wall to penetrate through the other surface from one surface.

In addition, it may include a sealing member in which a lower surface is in contact with the partition wall, and an accommodating groove is formed so that the position detection sensor is disposed on an upper surface thereof.

In addition, the partition wall may include a first guide being protruded upward from an upper surface and a second guide being protruded upward from an upper surface of the first guide.

In addition, an upper surface of the sensor magnet is disposed lower than an upper surface of the second guide and may be disposed higher than an upper surface of the partition wall.

In addition, the sealing member includes a first body being disposed on a lower surface of the printed circuit board, and a second body being protruded downward from a lower surface of the first body, and the second body may be disposed at an inner side of the second guide.

In addition, a lower surface of the second body may be in contact with an upper surface of the first guide.

In addition, a side surface of the second body may be in contact with an inner surface of the second guide.

In addition, a lower surface of the first body may be in contact with an upper surface of the second guide.

In addition, an inner circumferential surface of the shaft hole may be formed with an inclined surface such that the cross-sectional area becomes larger as it travels downward.

As another embodiment, the motor comprises: a housing including a partition wall partitioning a first space and a second space; a stator disposed inside the first space; a rotor disposed inside the stator; a shaft rotating together with the rotor and having a sensor magnet disposed at one end thereof; and a printed circuit board being disposed inside the second space, on one surface thereof in which a position detection sensor is disposed so as to face the sensor magnet in an up-down direction, wherein a shaft hole is disposed in the partition wall to penetrate through the other surface from one surface, and wherein a sealing member is disposed between an inner circumferential surface of the shaft hole and the sensor magnet.

Advantageous Effects

According to the present invention, since the distance between the sensor magnet and the position detection sensor is formed to be closer when compared to the prior art, there is an advantage in that the positions of the rotor and the shaft can be more accurately detected.

In addition, since a part of the shaft arrangement area is compensated through the shaft hole, there is an advantage that the product can be miniaturized.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under) ", the meaning of not only an upward direction but also a downward direction based on one component may be included.

Figure 1:
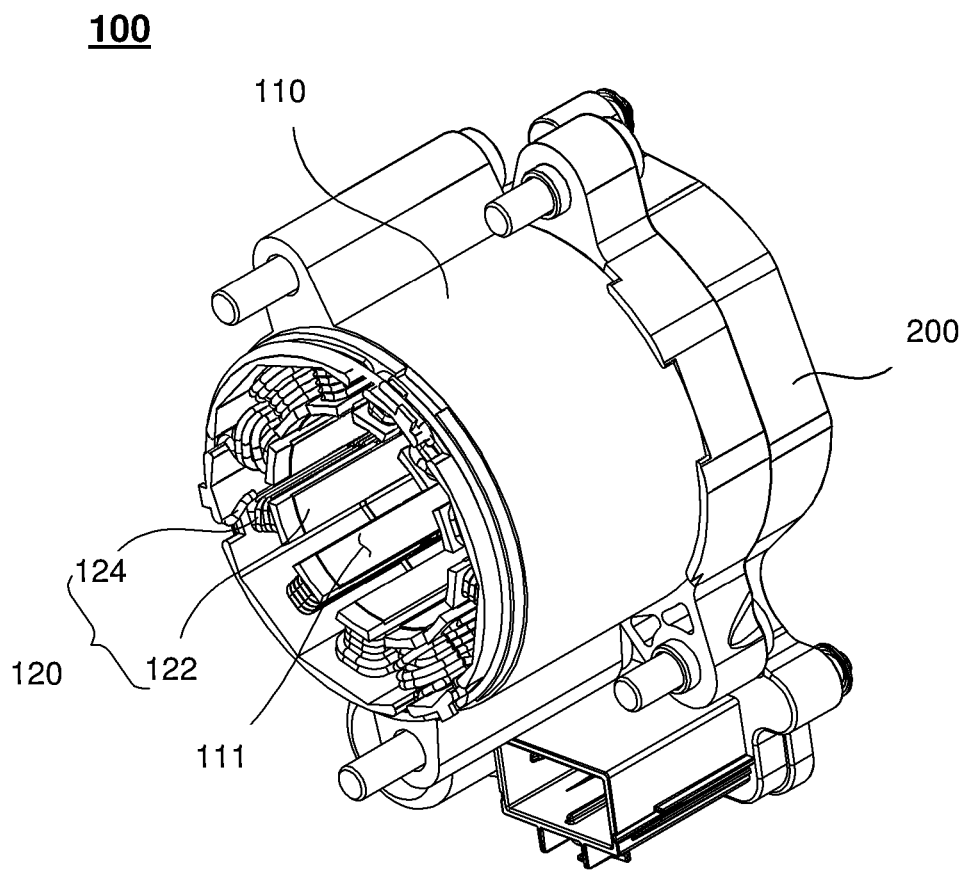
FIG. 1 is a perspective view of a motor according to a first embodiment of the present invention.
Figure 2:
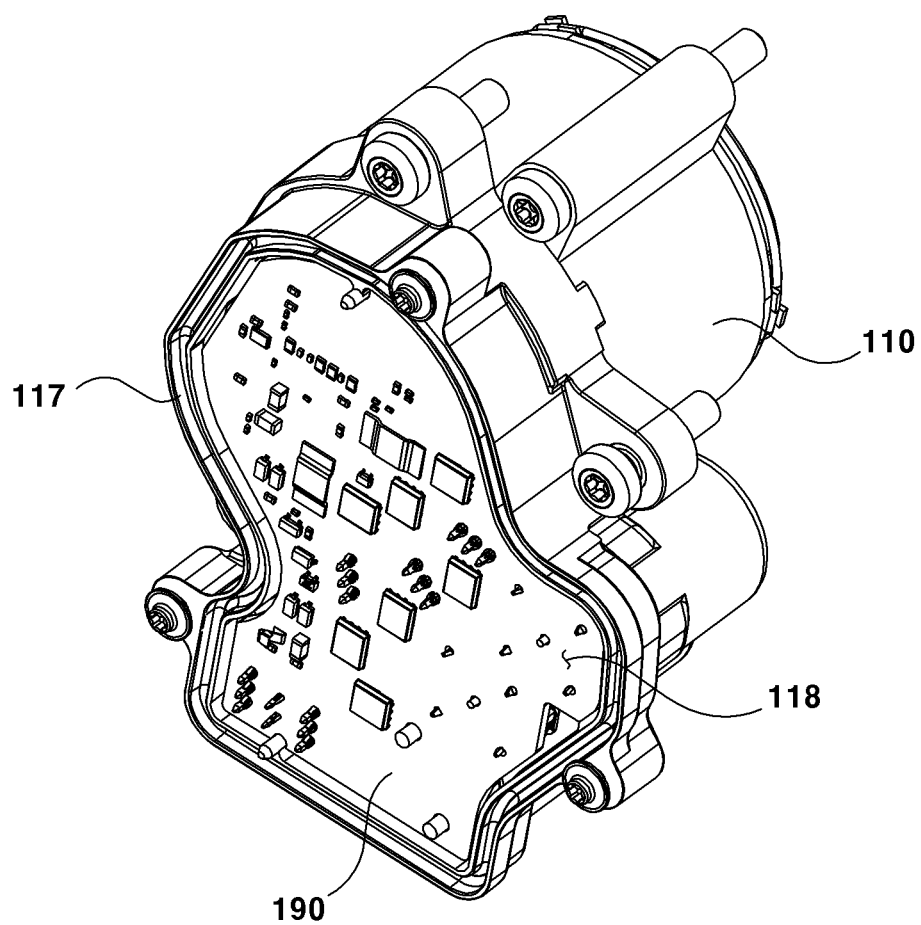
FIG. 2 is a perspective view illustrating a motor according to a first embodiment of the present invention at a different angle.
Figure 3:
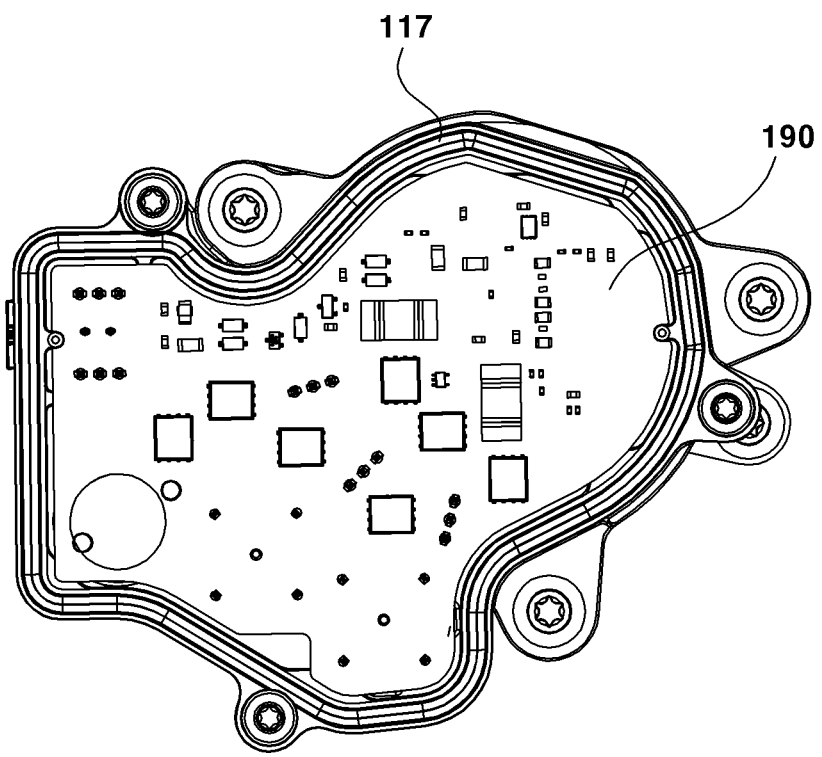
FIG. 3 is a plan view illustrating an upper surface of a motor according to a first embodiment of the present invention.
Figure 4:
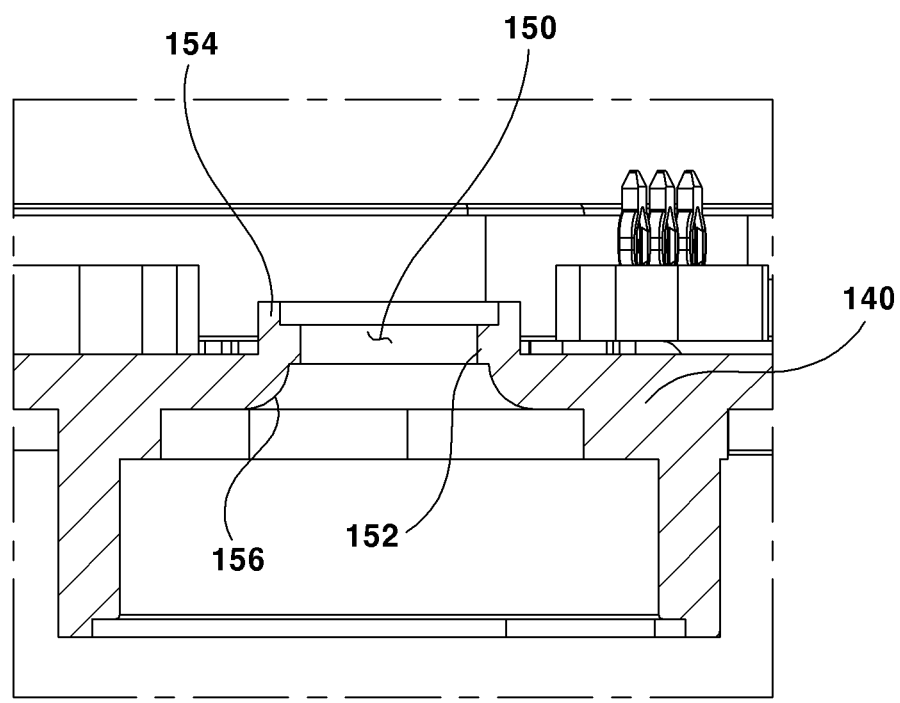
FIG. 4 is a cross-sectional view of a shaft hole according to a first embodiment of the present invention.
Figure 5:
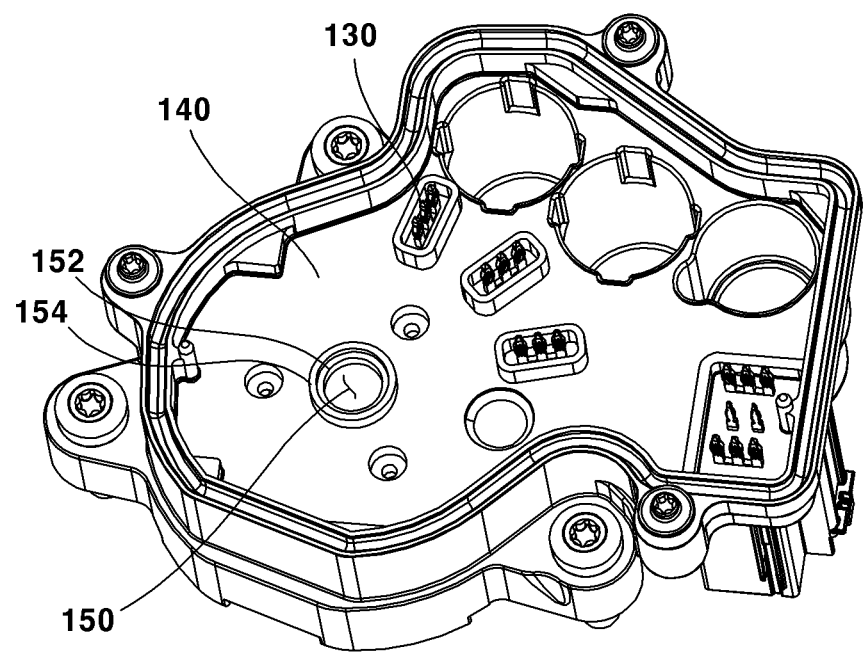
FIG. 5 is a perspective view illustrating an upper surface of the second space according to a first embodiment of the present invention.
Figure 6:
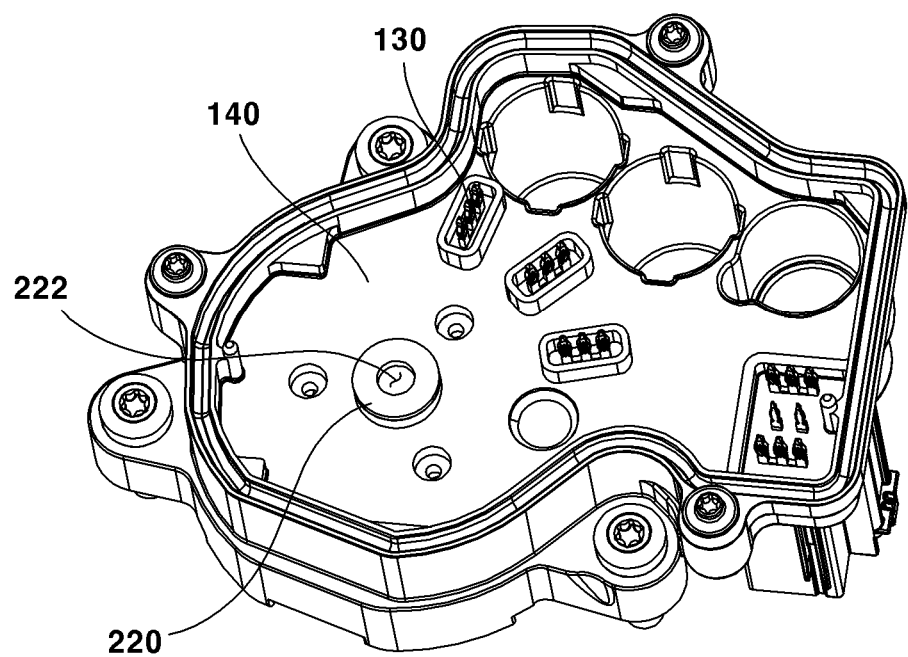
FIG. 6 is a perspective view illustrating a state in which a sealing member is coupled in FIG. 5.
Figure 7:
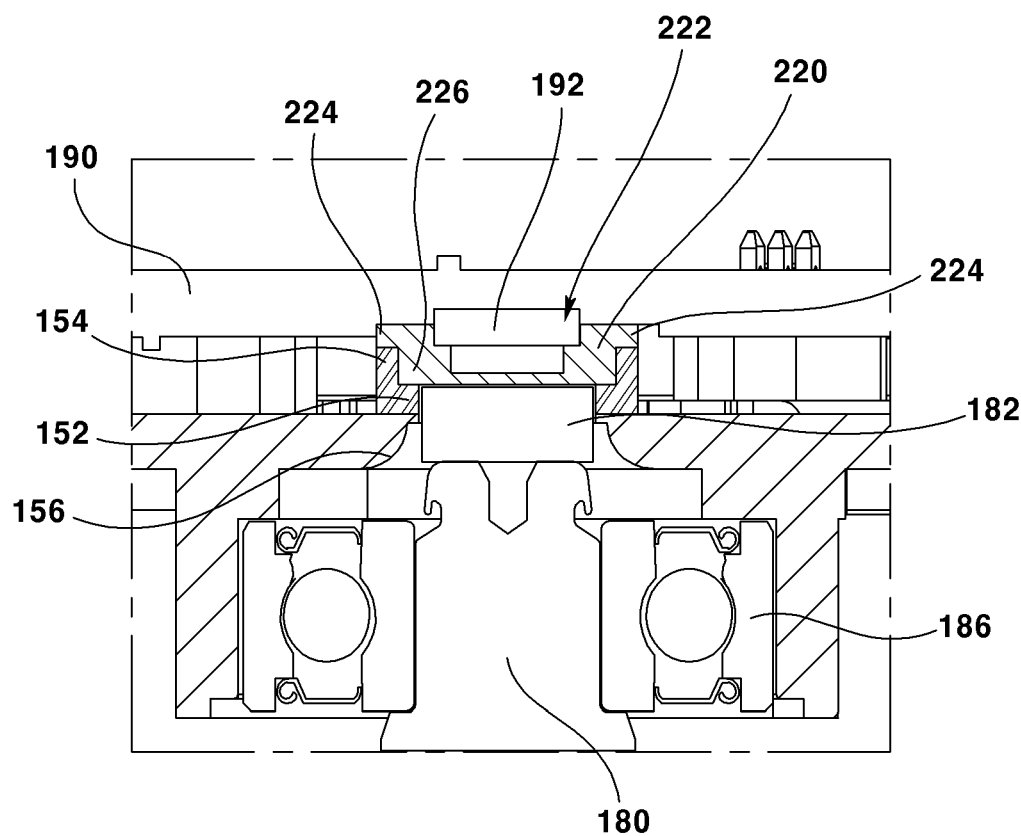
FIG. 7 is a cross-sectional view illustrating a rotation sensing structure according to a first embodiment of the present invention.

FIG. 1 is a perspective view of a motor according to a first embodiment of the present invention; FIG. 2 is a perspective view illustrating a motor according to a first embodiment of the present invention at a different angle; FIG. 3 is a plan view illustrating an upper surface of a motor according to a first embodiment of the present invention; FIG. 4 is a cross-sectional view of a shaft hole according to a first embodiment of the present invention; FIG. 5 is a perspective view illustrating an upper surface of the second space according to a first embodiment of the present invention; FIG. 6 is a perspective view illustrating a state in which a sealing member is coupled in FIG. 5; and FIG. 7 is a cross-sectional view illustrating a rotation sensing structure according to a first embodiment of the present invention.

Referring to FIGS. 1 to 7, an outer appearance of the motor 100 according to a first embodiment of the present invention may be formed by coupling the housing 110 and the cover 200. The cover 200 may be coupled to an upper surface of the housing 110.

Inside the housing 110, a first space 111 may be formed such that a stator 120, a rotor (not shown), and a shaft 180 are disposed. A separate cover (not shown) may be coupled to a lower surface of the housing 110 to cover the lower surface of the housing 110. The separate space inside the housing may be partitioned by the first space 111.

In the first space 111, the stator 120, the rotor (not shown) and the shaft 180 may be disposed. The stator 120 may include a stator core 122 and a coil 124 wound around the stator core 122. An insulator (not shown) may be disposed on an outer surface of the stator core 122 so that the coil 124 is wound.

On an inner side of the stator 120, a rotor to which the shaft is coupled may be disposed in the center. The rotor may include a rotor core and a magnet. Accordingly, when a current is applied to the coil, the shaft may rotate together with the rotor by electromagnetic interaction between the coil and the magnet. A bearing 186 for supporting the rotation of the shaft 180 may be disposed in the first space 111.

On an upper surface of the housing 110, the second space 118 may be formed so that the printed circuit board 190 is disposed. The second space 118 may be formed to be recessed more downward than the other area of the upper surface of the housing 110. The second space 118 may be partitioned from other regions by an edge portion 117. When the cover 200 is coupled to an upper surface of the housing 110, the second space 118 may be covered from an external area.

In the second space 118, the printed circuit board 190 may be disposed. In the printed circuit board 190, a plurality of electronic components for driving the motor 100 may be disposed. In the printed circuit board 190, a position detection sensor 192, which will be described later, may be disposed.

The first space 111 and the second space 118 may be partitioned by a partition wall 140. A lower surface of the partition wall 140 may form an upper surface of the first space 111. An upper surface of the partition wall 140 may form a bottom surface of the second space 118.

On a bottom surface of the second space 118, the terminal 130 may be disposed through the partition wall 140. The terminal 130 may electrically couple the printed circuit board 190 and the coil 124 to each other.

Meanwhile, a sensor magnet 182 may be disposed at one end of the shaft 180 to detect the positions of the rotor and the shaft 180. The sensor magnet 182 may be coupled to an upper end of the shaft 180. The sensor magnet 182 may be coupled to an upper outer circumferential surface of the shaft 180.

On a lower surface of the printed circuit board 190 facing the sensor magnet 182, a position detection sensor 192 may be disposed. The position detection sensor 192 and the sensor magnet 182 may be disposed to face each other in in an up-down direction. The position detection sensor 192 may detect the magnetic force generated by the sensor magnet 182 to detect the position of the shaft 180. The position detection sensor 192 is a 3-axis linear sensor capable of detecting positions in the X-axis, Y-axis, and Z-axis directions, and may detect the position of the shaft 180 by converting two sensed values among the measured values into linear values. The position detection sensor 192 may include a Hall sensor. The separation distance between the sensor magnet 182 and the position detection sensor 192 may be 1.0 mm or less.

An upper surface of the sensor magnet 182 may be disposed higher than an upper surface of the partition wall 140. An upper surface of the sensor magnet 182 may be disposed higher than a bottom surface of the second space 118.

On the partition wall 140, a shaft hole 150 may be formed so that at least a portion of the shaft 180 penetrates through a lower surface from an upper surface. A portion of an upper end of the shaft 180 may be disposed at an inner side of the shaft hole 150 through the shaft hole 150. Since the sensor magnet 182 is disposed on the upper end of the shaft 180, the sensor magnet 182 and the position detection sensor 192 may be disposed relatively close to each other through the shaft hole 150.

In detail, on an upper surface of the partition wall 140, a first guide 152 being protruded upward and having the shaft hole 150 disposed at an inner side thereof, and a second guide 154 being protruded upward from the upper surface of the first guide 152 may be included. The first guide 152 and the second guide 154 may be formed to have a step. The first guide 152 may be disposed at an inner side of the second guide 154. An upper surface of the second guide 154 may be formed to be higher than an upper surface of the first guide 152. An upper end of the shaft 180 and an upper surface of the sensor magnet 182 may be disposed lower than an upper surface of the first guide 152.

An inclined surface 156 may be formed on an inner circumferential surface of the shaft hole 150 so that the cross-sectional area becomes wider as it travels downward. Unlike this, the inner circumferential surface of the shaft hole 150 may be a curved surface having a shape in which the cross-sectional area becomes wider as it travels downward. Accordingly, when assembling the shaft 180 inside the housing 110, the shaft 180 may be easily guided to the shaft hole 150.

A sealing member 220 may be disposed on a lower surface of the printed circuit board 190. An upper surface of the sealing member 220 is coupled to a lower surface of the printed circuit board 190, and a lower surface may be coupled to an upper surface of the partition wall 140. The sealing member 220 may be disposed to surround the position detection sensor 192.

In more detail, the sealing member 220 may include: a first body 224 coupled to a lower surface of the printed circuit board 190; a second body 226 being protruded downward from a lower surface of the first body 224 and disposed at an inner side of the second guide 154. The cross-sectional area of the second body 226 may be formed to be smaller than the cross-sectional area of the first body 224.

A lower surface of the second body 226 may be in contact with an upper surface of the first guide 152. A side surface of the second body 226 may be in contact with an inner surface of the second guide 154. A lower surface of the first body 224 may be in contact with an upper surface of the second guide 154. According to the structure as described above, the first space 111 and the second space 118 may be mutually sealed by the sealing member 220.

Meanwhile, on an inner side of the first body 224 and the second body 226, an accommodating groove 222 in which the position detection sensor 192 is accommodated may be formed. That is, the accommodating groove 222 may be formed to be recessed more downward from the center of an upper surface of the sealing member 220 than other regions.

The sealing member 220 may be formed of a rubber or resin material.

According to the structure as described above, since the distance between the sensor magnet and the position detection sensor is formed to be closer when compared to the prior art, there is an advantage in that the positions of the rotor and the shaft can be more accurately detected.

In addition, since a part of the shaft arrangement area is compensated through the shaft hole, there is an advantage that the product can be miniaturized.

Hereinafter, a motor according to a second embodiment will be described.

Figure 8:
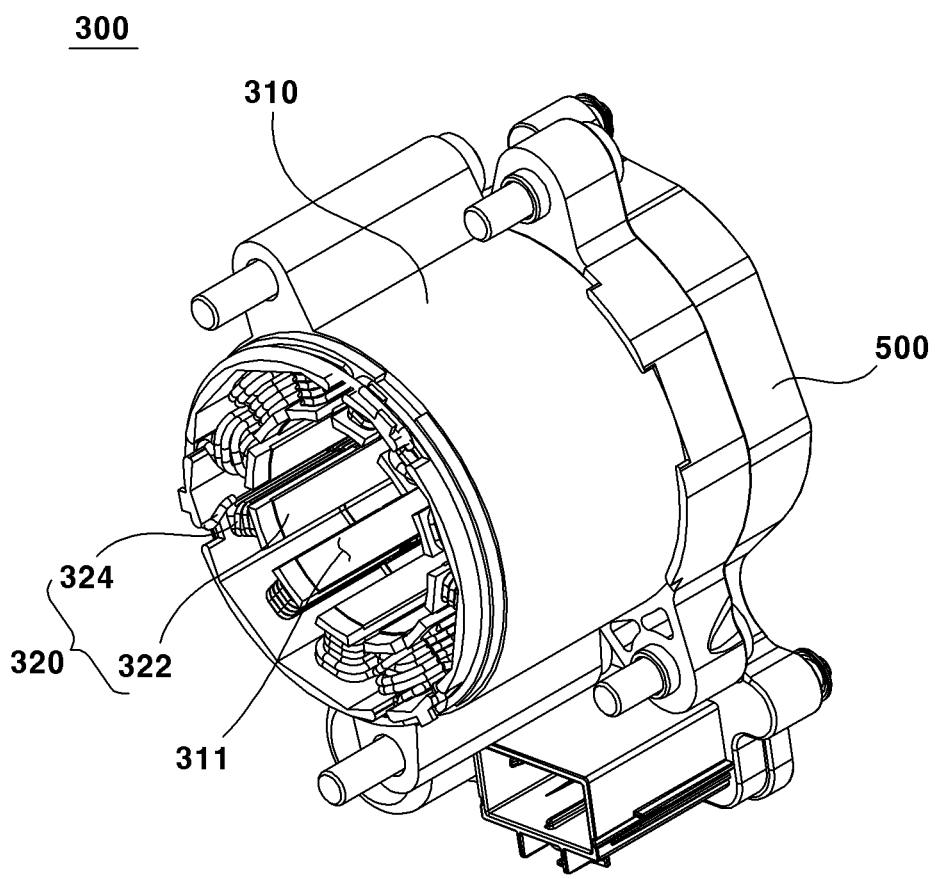
FIG. 8 is a perspective view of a motor according to a second embodiment of the present invention.
Figure 9:
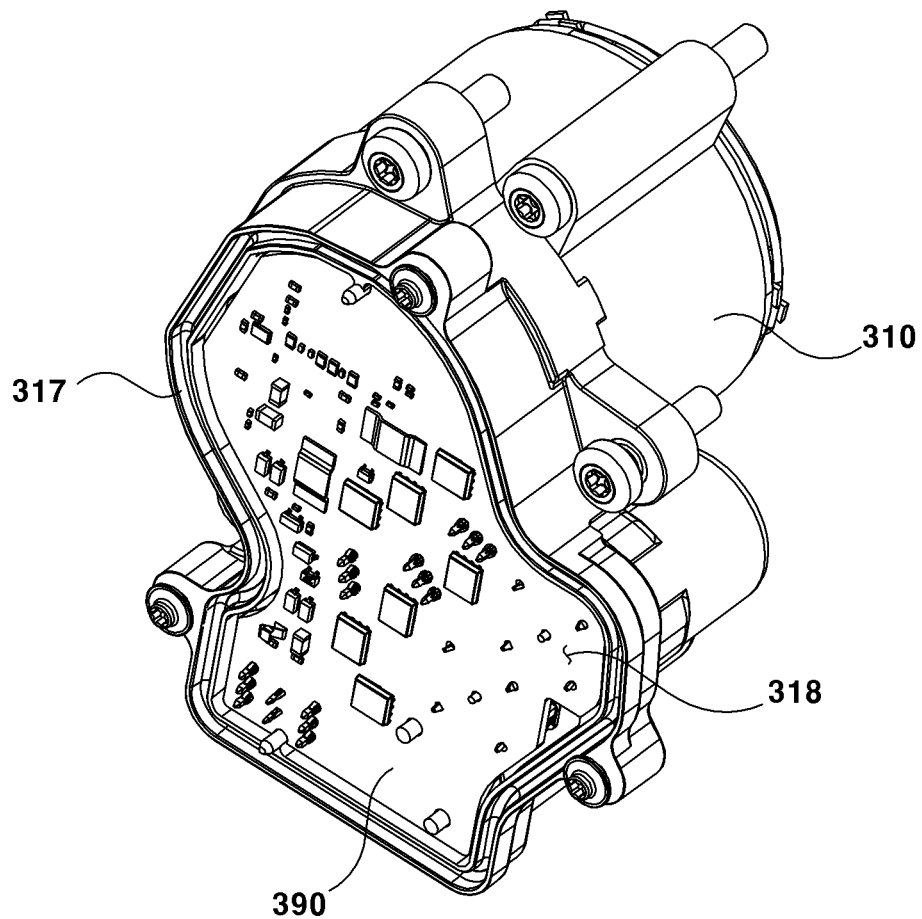
FIG. 9 is a perspective view illustrating a motor according to a second embodiment of the present invention from another angle.
Figure 10:
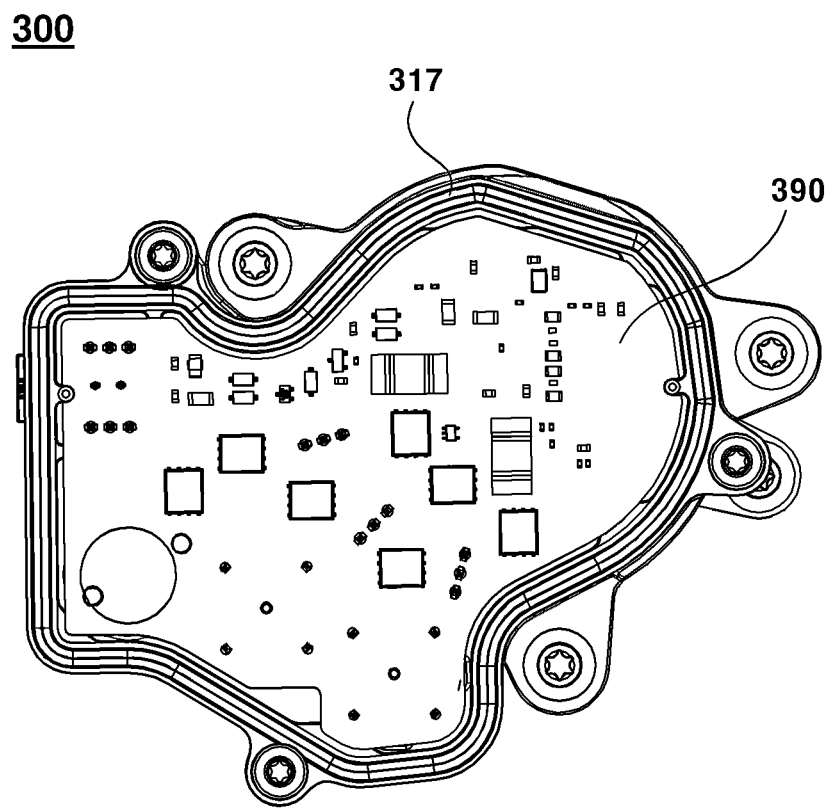
FIG. 10 is a plan view illustrating an upper surface of a motor according to a second embodiment of the present invention.
Figure 11:
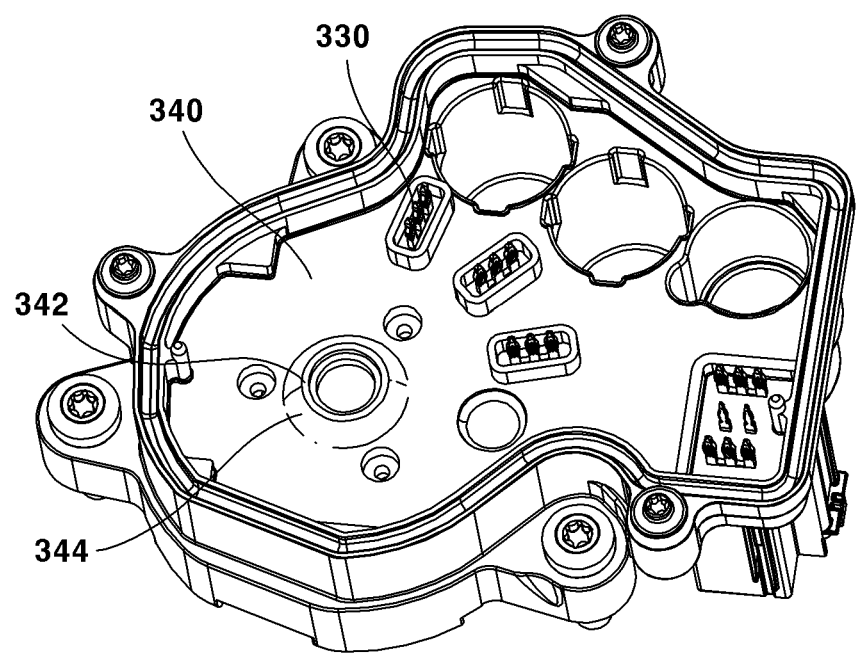
FIG. 11 is a perspective view illustrating a bottom surface of a second space according to a second embodiment of the present invention.
Figure 12:
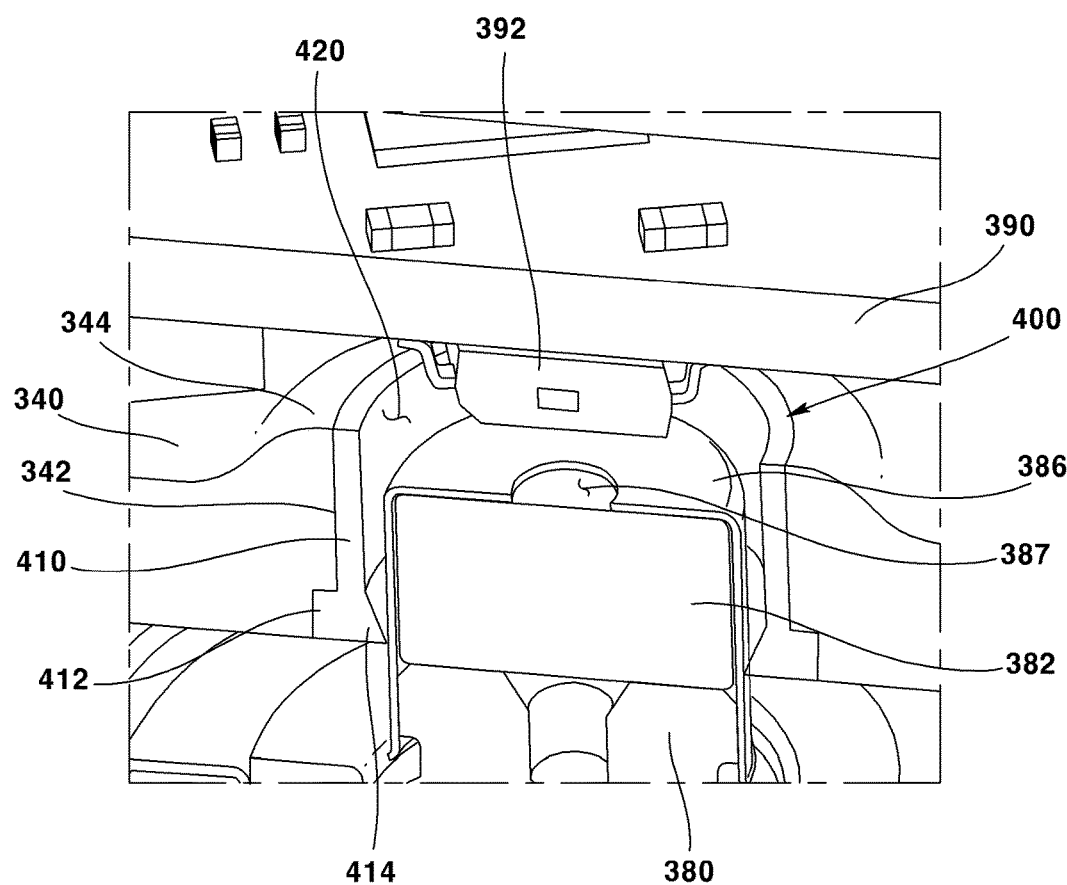
FIG. 12 is a perspective view of a rotation sensing structure according to a second embodiment of the present invention.
Figure 13:
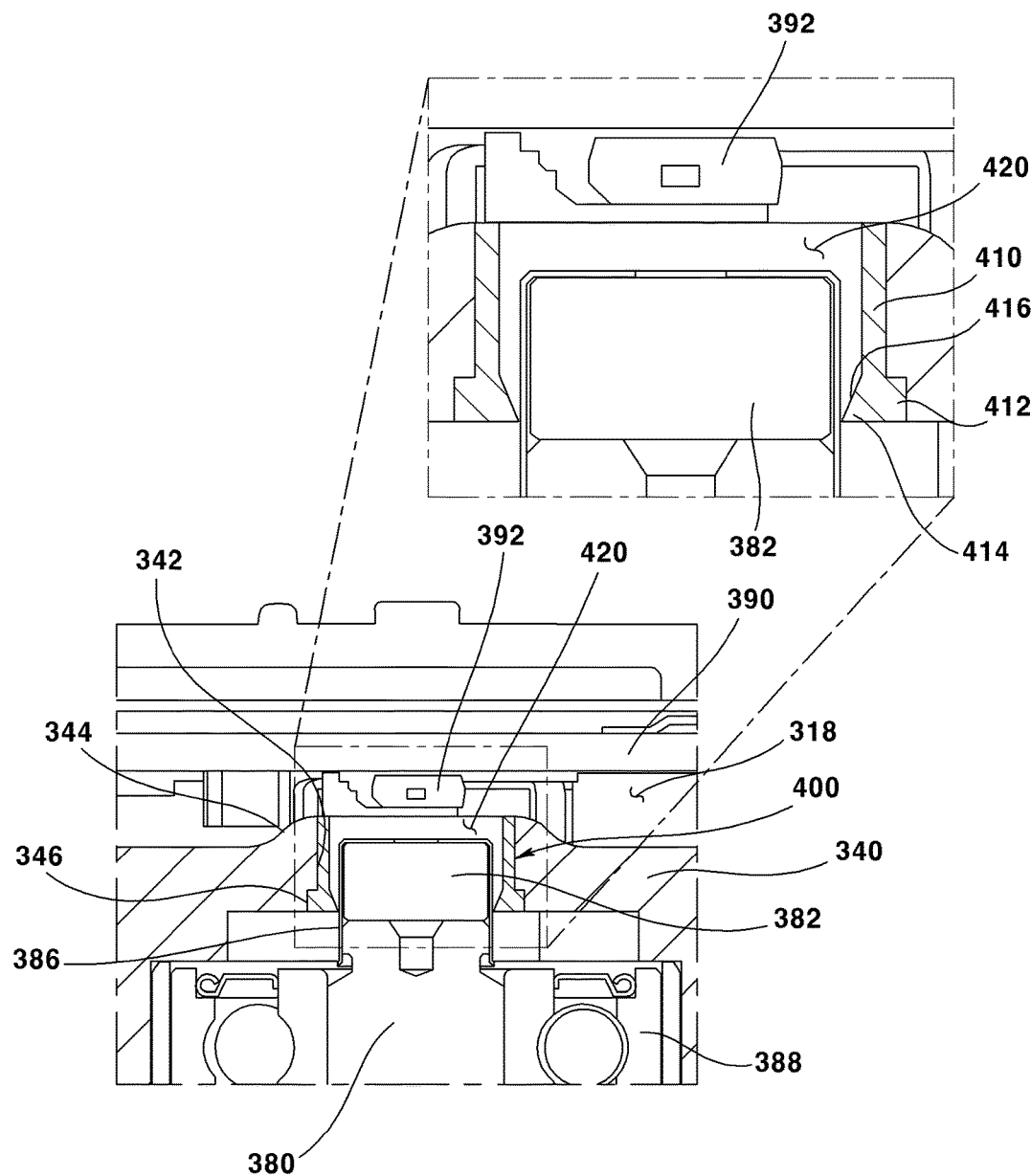
FIG. 13 is a cross-sectional view of a rotation sensing structure according to a second embodiment of the present invention.

FIG. 8 is a perspective view of a motor according to a second embodiment of the present invention; FIG. 9 is a perspective view illustrating a motor according to a second embodiment of the present invention from another angle; FIG. 10 is a plan view illustrating an upper surface of a motor according to a second embodiment of the present invention; FIG. 11 is a perspective view illustrating a bottom surface of a second space according to a second embodiment of the present invention; FIG. 12 is a perspective view of a rotation sensing structure according to a second embodiment of the present invention; and FIG. 13 is a cross-sectional view of a rotation sensing structure according to a second embodiment of the present invention.

Referring to FIGS. 8 to 13, an outer appearance of the motor 300 according to a second embodiment of the present invention may be formed by coupling the housing 310 and the cover 500. The cover 500 may be coupled to an upper surface of the housing 310.

Inside the housing 310, a first space 311 may be formed such that a stator 320, a rotor (not shown), and a shaft 380 are disposed. A separate cover (not shown) may be coupled to a lower surface of the housing 310 to cover the lower surface of the housing 310. The separate space inside the housing may be partitioned by the first space 311.

In the first space 311, the stator 320, the rotor (not shown) and the shaft 380 may be disposed. The stator 320 may include a stator core 322 and a coil 324 wound around the stator core 322. An insulator (not shown) may be disposed on an outer surface of the stator core 322 so that the coil 324 is wound.

On an inner side of the stator 320, a rotor to which the shaft 380 is coupled may be disposed in the center. The rotor may include a rotor core and a magnet. Accordingly, when a current is applied to the coil, the shaft may rotate together with the rotor by electromagnetic interaction between the coil and the magnet. A bearing 388 for supporting the rotation of the shaft 380 may be disposed in the first space 311.

On an upper surface of the housing 310, the second space 318 may be formed so that the printed circuit board 390 is disposed. The second space 318 may be formed to be recessed more downward than the other area of the upper surface of the housing 310. The second space 318 may be partitioned from other regions by an edge portion 317. When the cover 500 is coupled to an upper surface of the housing 310, the second space 318 may be covered from an external area.

In the second space 318, the printed circuit board 390 may be disposed. In the printed circuit board 390, a plurality of electronic components for driving the motor 300 may be disposed. In the printed circuit board 390, a position detection sensor 392, which will be described later, may be disposed.

The first space 311 and the second space 318 may be partitioned by a partition wall 340. A lower surface of the partition wall 340 may form an upper surface of the first space 311. An upper surface of the partition wall 340 may form a bottom surface of the second space 318.

On a bottom surface of the second space 318, the terminal 330 may be disposed through the partition wall 340. The terminal 330 may electrically couple the printed circuit board 390 and the coil 324 to each other.

Meanwhile, a sensor magnet 382 may be disposed at one end of the shaft 380 to detect the positions of the rotor and the shaft 380. The sensor magnet 382 may be coupled to an upper end of the shaft 380. The sensor magnet 382 may be coupled to an upper outer circumferential surface of the shaft 380.

At an upper end of the shaft 380, a magnet cover 386 may be disposed to surround the sensor magnet 382. The magnet cover 386 may be coupled to an upper end of the shaft 380 to accommodate the sensor magnet 382 at an inner side thereof. In the magnet cover 386, a through hole 387 penetrating through a lower surface from an upper surface is formed so that the sensor magnet 382 may be disposed to face the position detection sensor 392 in an up-down direction.

On a lower surface of the printed circuit board 390 facing the sensor magnet 382, a position detection sensor 392 may be disposed. The position detection sensor 392 and the sensor magnet 382 may be disposed to face each other in an up-down direction. The position detection sensor 392 may detect the magnetic force generated by the sensor magnet 382 to detect the position of the shaft 380. The position detection sensor 392 is a 3-axis linear sensor capable of detecting positions in the X-axis, Y-axis, and Z-axis directions, and may detect the position of the shaft 380 by converting two sensed values among the measured values into linear values. The position detection sensor 392 may include a Hall sensor. The separation distance between the sensor magnet 382 and the position detection sensor 392 may be 1.0 mm or less.

An upper surface of the sensor magnet 382 may be disposed higher than a lower surface of the partition wall 340. An upper surface of the sensor magnet 382 forms the same height as the bottom surface of the second space 318 or may be disposed higher than the bottom surface of the second space 318.

On the partition wall 340, a shaft hole 342 may be formed so that at least a portion of the shaft 380 penetrates through a lower surface from an upper surface. A portion of an upper end of the shaft 180 may be disposed at an inner side of the shaft hole 342 through the shaft hole 342. Since the sensor magnet 382 is disposed on an upper end of the shaft 380, the sensor magnet 382 and the position detection sensor 392 may be disposed relatively close to each other through the shaft hole 342.

At an inner side of the shaft hole 342, a sealing member 400 may be disposed. The sealing member 400 may be disposed in a way that an outer circumferential surface is in contact with an inner circumferential surface of the shaft hole 342, so that a part of the inner circumferential surface presses part of the outer circumferential surface of the shaft 380. The sealing member 400 may be formed of a rubber material to seal the first space 311 and the second space 318 from each other.

In detail, the sealing member 400 may have a ring-shaped cross section 410 in which a hole 420 is formed in the center. A rib 412 at least partially being protruded outward may be formed on an outer circumferential surface of the sealing member 400. The rib 412 may be disposed at a lower end of the outer circumferential surface of the sealing member 400.

A rib groove 346 which is recessed more outward than other regions may be disposed in a region facing the rib 412 in an inner circumferential surface of the shaft hole 342. Accordingly, the rib 412 may be coupled to the rib groove 346. Accordingly, the sealing member 400 can be firmly fixed inside the shaft hole 342.

On an inner circumferential surface of the sealing member 400, a pressing portion 414 protruding inward than other regions may be formed. The pressing portion 414 may be in contact with the outer circumferential surface of the shaft 380. The pressing portion 414 may be formed to press the outer surface of the magnet cover 386. Accordingly, a gap is not generated between the magnet cover 386 and the sealing member 400, so that the first space 311 and the second space 318 can be sealed from each other.

On an inner surface of the pressing portion 414, an inclined surface 416 having a shape in which the cross-sectional area becomes smaller as it travels downward may be formed. Accordingly, an area other than a lower end of the pressing portion 414 may be spaced apart from an outer surface of the magnet cover 386. That is, by forming a relatively small contact area between the sealing member 400 and the shaft 380, the rotational efficiency of the shaft 380 can be improved.

In a periphery region of the arrangement region of the shaft hole 342 in an upper surface of the partition wall 340, a protrusion 344 being protruded more upward than other regions may be formed. Accordingly, the shaft hole 342 may be disposed at an inner side of the protrusion 344. As a result, since an upper end of the shaft 380 can be disposed relatively higher than other regions of the upper surface of the partition wall 340, the distance between the sensor magnet 382 and the position detection sensor 392 can be formed closer.

An upper surface of the protrusion 344 may be formed to be protruded upward as it travels closer to the shaft hole 342 in a radial direction. An upper surface of the protrusion 344 may be a curved surface.

According to the structure as described above, since the distance between the sensor magnet and the position detection sensor is formed to be closer when compared to the prior art, there is an advantage in that the positions of the rotor and the shaft can be more accurately detected.

In addition, since a part of the shaft arrangement area is compensated through the shaft hole, there is an advantage that the product can be miniaturized.

In the above description, it is described that all the components constituting the embodiments of the present invention are combined or operated in one, but the present invention is not necessarily limited to these embodiments. In other words, within the scope of the present invention, all of the components may be selectively operated in combination with one or more. In addition, the terms "comprise", "include" or "having" described above mean that the corresponding component may be inherent unless specifically stated otherwise, and thus it should be construed that it does not exclude other components, but further include other components instead. All terms, including technical and scientific terms, have the same meaning as commonly understood by one of ordinary skill in the art unless otherwise defined. Terms used generally, such as terms defined in a dictionary, should be interpreted to coincide with the contextual meaning of the related art, and shall not be interpreted in an ideal or excessively formal sense unless explicitly defined in the present invention.

The above description is merely illustrative of the technical idea of the present invention, and those skilled in the art to which the present invention pertains may make various modifications and changes without departing from the essential characteristics of the present invention. Therefore, the embodiments disclosed in the present invention are not intended to limit the technical idea of the present invention but to describe the present invention, and the scope of the technical idea of the present invention is not limited by these embodiments. The protection scope of the present invention should be interpreted by the following claims, and all technical ideas within the equivalent scope should be interpreted as being included in the scope of the present invention.

The invention claimed is:

1. A motor comprising:
a housing including a partition wall partitioning a first space and a second space;
a stator disposed inside the first space;
a rotor disposed inside the stator;
a shaft rotating together with the rotor and having a sensor magnet disposed at one end thereof; and
a printed circuit board disposed in the second space and having a position detection sensor disposed on one surface to face the sensor magnet; and
a sealing member in which a lower surface of the sealing member is in contact with the partition wall, and an accommodating groove is formed so that the position detection sensor is disposed on an upper surface of the sealing member,
wherein a shaft hole is arranged to penetrate the partition wall,
wherein at least a portion of the shaft is disposed in the shaft hole, and
wherein the partition wall includes a first guide being protruded upward from an upper surface and a second guide being protruded upward from an upper surface of the first guide.

2. The motor according to claim 1,
wherein an upper surface of the sensor magnet is disposed lower than an upper surface of the second guide and is disposed higher than an upper surface of the partition wall.

3. The motor according to claim 1,
wherein the sealing member includes a first body being disposed on a lower surface of the printed circuit board, and a second body being protruded downward from a lower surface of the first body, and
wherein the second body is disposed at an inner side of the second guide.

4. The motor according to claim 3,
wherein a lower surface of the second body is in contact with an upper surface of the first guide.

5. The motor according to claim 3,
wherein a side surface of the second body is in contact with an inner surface of the second guide.

6. The motor according to claim 3,
wherein a lower surface of the first body is in contact with an upper surface of the second guide.

7. The motor according to claim 1,
wherein an inner circumferential surface of the shaft hole is formed with an inclined surface.

8. The motor according to claim 1, wherein a distance between the sensor magnet and the position detection sensor is 1.0 mm or less.

9. The motor according to claim 1, wherein a bearing supporting rotation of the shaft is disposed in the first space.

10. The motor according to claim 1, wherein a lower surface of the partition wall forms an upper surface of the first space, and
wherein an upper surface of the partition wall forms a bottom surface of the second space.

11. The motor according to claim 1, wherein a terminal is connected to a coil in the stator through the partition wall.

12. The motor according to claim 1, wherein an upper surface of the sensor magnet is disposed above a bottom surface of the second space.

13. The motor according to claim 1, wherein the first space and the second space are sealed to each other by the sealing member.

14. A motor comprising:
a housing including a partition wall partitioning a first space and a second space;
a stator disposed inside the first space;
a rotor disposed inside the stator; a shaft rotating together with the rotor and having a sensor magnet disposed at one end thereof;
a printed circuit board being disposed inside the second space, on one surface thereof in which a position detection sensor is disposed so as to face the sensor magnet; and
a sealing member in which a lower surface of the sealing member is in contact with the partition wall, and an accommodating groove is formed so that the position detection sensor is disposed on an upper surface of the sealing member,
wherein a shaft hole is arranged to penetrate the partition wall, and
wherein the first space and the second space are sealed to each other by the sealing member.

15. The motor according to claim 14, wherein an accommodating groove to which the position detection sensor is coupled is formed on an upper surface of the sealing member.

16. The motor according to claim 14, wherein an upper surface of the sensor magnet is disposed above a bottom surface of the second space.

17. The motor according to claim 14, wherein a distance between the sensor magnet and the position detection sensor is 1.0 mm or less.

* * * * *